US009624953B2

(12) United States Patent
Veilleraud

(10) Patent No.: US 9,624,953 B2
(45) Date of Patent: Apr. 18, 2017

(54) METHOD FOR TEMPORARILY CONNECTING TWO PARTS TOGETHER, SUCH AS TWO STAGES OF A SPACE LAUNCHER, AND ASSEMBLY INCLUDING TWO TEMPORARILY CONNECTED PARTS

(75) Inventor: Frédéric Veilleraud, Triel sur Seine (FR)

(73) Assignee: ASTRIUM SAS, Paris (FR)

(*) Notice: Subject to any disclaimer, the term of this patent is extended or adjusted under 35 U.S.C. 154(b) by 224 days.

(21) Appl. No.: 14/113,002

(22) PCT Filed: Apr. 20, 2012

(86) PCT No.: PCT/EP2012/057274
§ 371 (c)(1),
(2), (4) Date: Oct. 21, 2013

(87) PCT Pub. No.: WO2012/146538
PCT Pub. Date: Nov. 1, 2012

(65) Prior Publication Data
US 2014/0044478 A1    Feb. 13, 2014

(30) Foreign Application Priority Data
Apr. 26, 2011  (FR) ...................................... 11 53560

(51) Int. Cl.
*F16B 11/00*        (2006.01)
*B64G 1/64*         (2006.01)

(52) U.S. Cl.
CPC ............ *F16B 11/006* (2013.01); *B64G 1/641* (2013.01); *Y10T 403/477* (2015.01)

(58) Field of Classification Search
CPC ........ B64G 1/641; B64G 1/645; B64C 1/069; F42B 15/36; F42B 15/38; Y10T 403/477
(Continued)

(56) References Cited

U.S. PATENT DOCUMENTS 4,627,355 A * 12/1986 Gause .................. B23D 15/145
                                                         102/378
4,648,227 A *  3/1987 Reusch .................... B64D 1/00
                                                         102/378
(Continued)

FOREIGN PATENT DOCUMENTS

EP            0905022 A1      3/1999

OTHER PUBLICATIONS

International Search Report for PCT/EP2012/057274 dated Jun. 20, 2012.

*Primary Examiner* — Josh Skroupa
*Assistant Examiner* — Matthew R McMahon
(74) *Attorney, Agent, or Firm* — Pearne & Gordon, LLP

(57) ABSTRACT

An assembly comprising two parts temporarily connected by a connecting element surrounding the assembly. The connecting element being subjected to an internal deformation stress. The assembly having stress-keeping means with controlled stress relief, which connect two opposite ends of the connecting element so as to counteract the internal deformation stress. The assembly includes attaching means for attaching the connecting element to each of the parts. The attaching means includes at least two layers of cured adhesive which respectively coat the parts and make a surface connection between each of these parts and the connecting element. The internal deformation stress is at a sufficient level to enable the connecting element to be unsecured from the parts by extending to a rest position, when the stress-keeping means are controlled so as to release the ends of the connecting element.

12 Claims, 1 Drawing Sheet

(58) Field of Classification Search
USPC .............. 244/173.1, 173.3; 156/16; 102/378, 102/275.5
See application file for complete search history.

(56) References Cited

U.S. PATENT DOCUMENTS

| | | | | |
|---|---|---|---|---|
| 5,157,816 | A * | 10/1992 | Huessler | B64G 1/641 24/279 |
| 6,076,467 | A * | 6/2000 | Cespedosa | F42B 15/36 102/377 |
| 6,227,493 | B1 * | 5/2001 | Holemans | B64G 1/641 244/173.1 |
| 6,250,227 | B1 * | 6/2001 | Salort | F15B 15/19 102/312 |
| 8,607,706 | B2 * | 12/2013 | Kister | B64G 1/645 102/335 |
| 8,979,035 | B2 * | 3/2015 | Straumann | B64G 1/641 244/173.1 |
| 2003/0133748 | A1 | 7/2003 | Buder | |
| 2007/0080260 | A1 | 4/2007 | Lancho Doncel | |

* cited by examiner

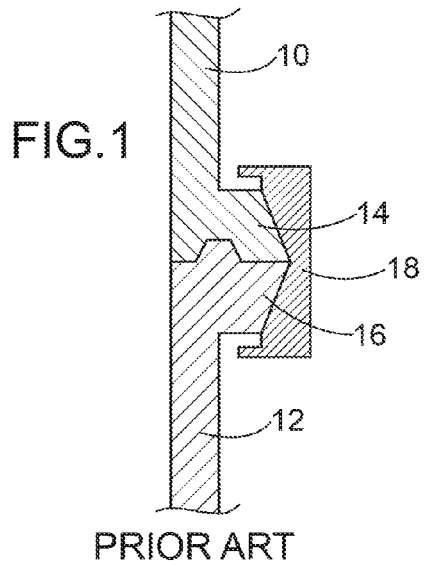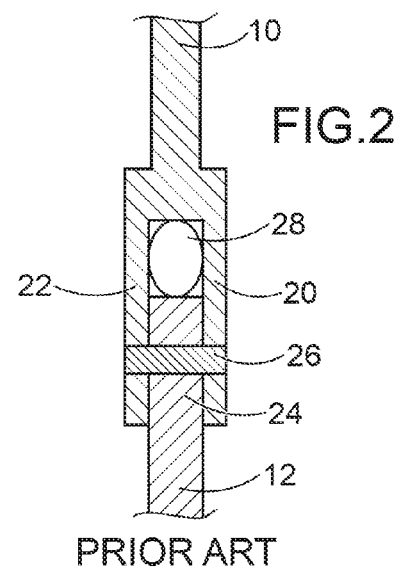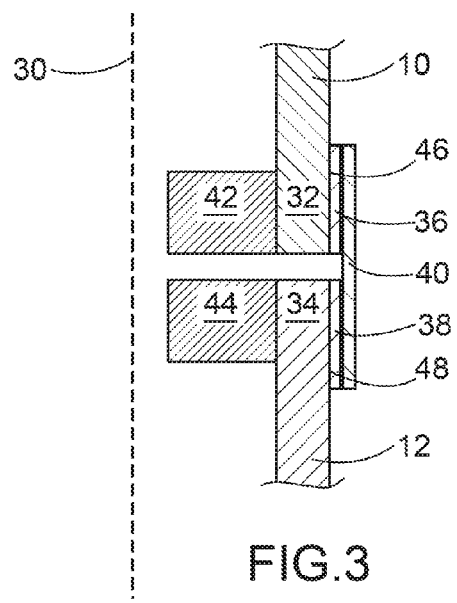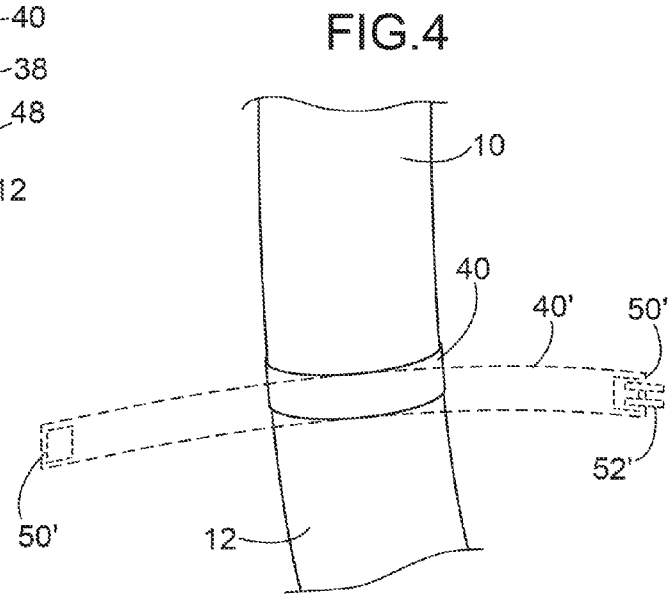

METHOD FOR TEMPORARILY CONNECTING TWO PARTS TOGETHER, SUCH AS TWO STAGES OF A SPACE LAUNCHER, AND ASSEMBLY INCLUDING TWO TEMPORARILY CONNECTED PARTS

TECHNICAL FIELD

The present invention relates to the field of temporary connections between two parts.

It was initially developed for an application to the structural connection between two stages of a space launcher, but it can also be applied to the connection between a payload and a space launcher, satellite, probe, missile or airplane, or even to the connection of any type of parts which must be controllably separated.

The invention relates in particular to a method for temporarily connecting two parts, as well as an assembly of two parts temporarily connected by a connecting element.

STATE OF PRIOR ART

Space launchers comprise several stages intended to be successively separated during a flight. Before they are separated, these stages are connected in pairs by structural connections, that is able to transmit mechanical strains between these stages, in particular tensile strains, and capable of being controllably ruptured to cause a separation of these stages.

In launchers of a known type, these structural connections are for example made by means of two metal radial flanges and a metal strap for longitudinally tightening these flanges.

Appended FIG. 1 is a longitudinal partial schematic cross-section half-view illustrating this type of connection. There can be seen two revolution cylindrical walls 10 and 12 being respectively part of two consecutive stages of a space launcher, and each comprising a respective radial flange 14, 16, as well as a tightening strap 18 surrounding the flanges 14 and 16. The flanges and the strap are shaped such that the strap ensures a longitudinal tightening or clamping of the flanges one against the other. In this type of connection, the strap 18 has two free ends which are connected by controlled tightening means of the explosive structure type or the like, such as release bolts (not visible in the figure).

This type of connection has the drawback to require a mutual contact between radial flanges on the one hand, and between these flanges and the strap on the other hand.

The presence of these flanges induces an undesirable extra mass. Moreover, the contact between the flanges and the strap requires careful control of friction between these elements as well as great geometric accuracy in making the same, which induces high costs and makes composite materials difficult to use.

That is the reason why elements involved in connections of this type are made of metal, which induces additional costs because of the relatively high mass of these elements. Moreover, this makes such elements difficult to use when the cylindrical walls 10 and 12 are of composite material.

Structural connections ensured by an assembly of flanges integrating an explosive charge are also known, such as an explosive cord.

Appended FIG. 2 is a longitudinal partial schematic cross-section half-view illustrating this type of connection. There can be seen two revolution cylindrical walls 10 and 12 being respectively part of two consecutive stages of a space launcher, wherein the wall 10 of the upper stage includes at its lower end two longitudinal flanges 20, 22 between which is engaged a longitudinal flange 24 of the wall 12 of the lower stage, the latter flange 24 being attached to both flanges 20 and 22 by bolts 26 or the like. The assembly of the three aforesaid flanges bounds a cavity wherein is provided an explosive cord 28 enabling when exploding, the flanges 20, 22 of the upper stage to be ruptured.

Because of the contact between the three flanges, this type of connection has drawbacks similar to that of the first type of connection in controlling the friction between the flanges and in geometric accuracy in making these flanges. This type of connection also makes composite materials difficult to use. This type of connection further has the drawback to require a complex assembly.

DISCLOSURE OF THE INVENTION

The object of the invention is in particular to provide a simple, economic and efficient solution to these problems, enabling at least in part the aforesaid drawbacks to be avoided.

To that end, the invention provides a method for making a temporary connection between two parts characterised in that it includes at least the steps of:

placing a connecting element into an operating position wherein said connecting element surrounds the assembly formed by said parts and is subjected to an internal deformation strain;

locking the position of said connecting element by stress-keeping means with controlled stress relief, which connect two opposite ends of said connecting element;

connecting said connecting element to each of said parts by attaching means;

and wherein said internal deformation stress is at a sufficient level to enable the connecting element to be unsecured from said parts by extending to a rest position, when said stress-keeping means are controlled so as to release said ends from said connecting element.

The internal stress of the connecting element thus is a separation force which can be controllably used to cause unsecuring of the connecting element, and thus rupture of the connection between the parts.

This internal stress is achieved by a prior pre-stress of the connecting element, such that the positioning of this element into its operating position requires a deformation of said element during which the same is caused to accumulate potential mechanical energy.

When the stress applied by the stress-keeping means is released following a control to that end, the internal stress of the connecting element causes the same to be extended to its rest position without stress by breaking or peeling off the aforesaid attaching means.

To that end, the energy accumulated in the connecting element because of its internal stress can in itself be higher than the connecting energy of the attaching means.

Alternatively, this energy accumulated in the connecting element can be added to a pulse energy imparted to the connecting element by the stress-keeping means upon releasing of the same.

Generally, this connection method enables simple, light and non-bulky connecting means to be used, and avoiding problems experienced with the connections of prior art as regards the control of friction between contacting parts.

It is worth of note that the fact that the connecting element surrounds the assembly formed by both parts can be found in several configurations, among which in particular a first configuration wherein each part is a cylindrical wall surrounded by a part of the connecting element, as will become clearer in the following, as well as a second configuration wherein a first one of the parts is a cylindrical body surrounded by the connecting element whereas the second part is, for example, a trap door or the like, which seals an aperture of the cylindrical body by being retained by the connecting element.

Besides, the parts can be made of metal or composite material.

The connecting element can also be made of metal or composite material.

In a preferred embodiment of the invention, the step of connecting said connecting element to each of said parts is implemented later than said steps of placing said connecting element and locking the position thereof.

Since the internal stress of the connecting element is resisted by the stress keeping means right from the step of locking the position of the connecting element, the subsequent attachment of the same to both parts can thus be performed with substantially no stress.

In this way, the attaching means can ensure a particularly efficient transmission of the connection strains between both parts through the connecting element, without being disturbed by the retrieval of the stress-keeping means of this connecting element.

In the preferred embodiment of the invention, the method includes a step, prior to placing said connecting element, wherein two layers of a curable adhesive are respectively applied to each of said parts, said connecting step comprising curing said adhesive such that the latter is part of said attaching means.

Using a layer of adhesive as the attaching means allows a surface connection between each part and the connecting element, so as to enable connection strains to be optimally transmitted between the parts.

To that end, the adhesive is preferably a rigid adhesive.

The curing of the adhesive, which makes the attachment of the connecting element to each of the parts, is caused after the position of the connecting element is locked such that this curing of the adhesive is made with substantially no stress.

In this regard, the adhesive is preferably a thermocurable or photocurable adhesive.

Generally, the adhesive is selected for the layers of this adhesive to have a tensile strain resistance which is sufficiently low to enable the connecting element to be peeled off upon releasing the ends thereof by the stress keeping means, as well as a shear strain resistance which is sufficiently great to enable the connection strains to be efficiently transmitted between the parts.

By way of example, adhesives based on an epoxy resin, such as those marketed by the Henkel Company under the trademark Hysol, are particularly suitable for the invention, and in particular the models having the commercial references EA9321, EA9394, EA9395 and EA9396.

Generally, using layers of adhesives as the attaching means makes the method particularly advantageous when the parts are made of composite material.

Besides, the aforesaid adhesive advantageously incorporates mineral microbeads forming spacers between each of said parts and said connecting element.

Using such microbeads enables, in a known manner per se, the thickness of the layer of adhesive of each part to be homogenized as well as stresses within said layer to be evenly distributed.

It thus allows to restrict risks that a layer of adhesive only partly breaks down when the connection rupture between the parts is desired.

Alternatively or additionally, the attaching means can comprise attaching through members such as rivets, bolts or the like, the tensile strain resistance of which is sufficiently low to enable them to be ruptured upon releasing the ends of the connecting element by the stress-keeping means, but the shear strain resistance of which is sufficiently great to enable connection strains to be efficiently transmitted between the parts.

In the preferred embodiment of the invention, the stress-keeping means apply to said connecting element strains substantially orthogonal to a main direction of transmitting tensile strains between said parts.

Thus, keeping under stress the connecting element can be well decorrelated from the transmission of the main tensile strains between the parts.

In this case, each part advantageously comprises a composite structure including a surface ply of reinforcing fibres embedded in a cured resin and extending parallel to said main direction of transmitting tensile strains between said parts.

The orientation of the fibres of the surface ply thus enables the tensile strains to be optimally transmitted between the parts. Moreover, this orientation of the fibres makes the ply relatively fragile to the strains that are induced by the internal stress of the connecting element when keeping under pressure of the same is interrupted following a control to that end of the stress-keeping means. The orientation of the fibres of the surface ply thus enables the connection between the parts to be easily ruptured at the desired time.

Said stress keeping means are preferably of the explosive rupture type.

In this case, the rupture of these means causes the releasing of the stress applied to the connecting element, and the detonation which has enabled this rupture further enables these means to impart energy, as a pulse, to the connecting element, for its deployment to be facilitated against the aforesaid attaching means.

These stress-keeping means take for example the form of release bolts.

Alternatively, these means may not be of the explosive rupture type but of a different type when this is of interest. These means can for example comprise a locking mechanism with electrical deblocking.

In a known manner per se, the method according to the invention can further comprise placing separating means designed to induce a separation of both parts after the connection between the same is ruptured, wherein these means can comprise springs, propellers or other conventional elements.

In the preferred embodiment of the invention, said parts are two respective structural cylindrical walls of two stages of a space launcher, and the connecting element is a circumferentially pre-stressed strap which surrounds each of said walls when the strap is in its operating position.

The method according to the invention is indeed particularly suitable for connecting two stages of a space launcher.

In this case, the stress-keeping means bias the free ends of the strap.

By strap, it is meant both a strap made as one piece and having two free ends, and a strap formed by assembling several segments connected by pairs by adequate connecting means. These connecting means can possibly be stress-keeping means with controlled relief. In this case, it is possible to arbitrarily define two free ends of the strap, for the purposes of the preceding description, among the ends of the segments making up this strap. However, it is worth of note that all the connections between segments of this strap are then functionally equivalent, and then are in particular able to take part in controllably rupturing the connection between both parts.

Moreover, when the connecting element is attached to each aforesaid cylindrical wall by means of a layer of adhesive, this layer of adhesive is preferably in the form of a strip surrounding said cylindrical wall.

In this way, the transmission of connection strains between the cylindrical walls can be evenly distributed throughout the circumference of the walls.

The invention also relates to an assembly comprising two parts temporarily connected by a connecting element surrounding said assembly, wherein:

said connecting element is subjected to an internal deformation stress, said assembly comprises stress-keeping means with controlled stress relief, which mutually bias two opposite ends of said connecting element so as to counteract said internal deformation stress, said assembly comprises means for attaching said connecting element to each of said parts, said internal deformation stress is at a sufficient level to enable the connecting element to be unsecured from said parts by extending to a rest position, when said stress keeping means are controlled so as to release this stress.

Such an assembly has substantially the same advantages as the connection method described above. This assembly can be obtained by the method described above or by an analogous method.

In the preferred embodiment of the invention, said attaching means comprise at least two layers of cured adhesive which respectively coat said parts and make a surface connection between each of these parts and said connecting element.

Such a surface connection enables the connection strains to be optimally transferred between the parts.

The aforesaid adhesive advantageously incorporates microbeads, as described above.

Moreover, said stress keeping means preferably apply to said connecting element strains substantially orthogonal to a main direction of transmitting tensile strains between said parts.

In this case, each of said parts advantageously comprises a composite structure comprising a surface ply of reinforced fibres embedded in a cured resin and extending parallel to said main direction of transmitting tensile strains between said parts.

In a known manner per se, the aforesaid assembly can further comprise separating means designed to induce a separation of both parts after the connection is ruptured between the same, wherein these means can for example comprise springs, propellers or other conventional elements.

In the preferred embodiment of the invention, said connecting element comprises a strap, and each of said parts comprises a cylindrical wall surrounded by said strap.

Such a strap enables connection strains to be evenly transmitted between the parts throughout the circumference of these parts, in particular when the attachment of the strap onto each part is made by means of a layer of adhesive as described above.

As explained above, by strap, it is meant both a strap made as one piece and having two free ends, and a strap formed by assembling several segments connected by pairs by adequate connecting means that can possibly be stress-keeping means with controlled stress relief.

In the preferred embodiment of the invention, each cylindrical wall advantageously comprises a circumferential stiffener attached to an internal surface of this wall facing corresponding attaching means, in order to resist part of the strains induced by the internal stress of the strap, in particular at an area of each wall diametrically opposed to the area of connecting the ends of the strap by the stress-keeping means.

The invention further relates to a space vehicle, such as a launcher, a satellite or a probe, or even a missile or an airplane, comprising at least an assembly of the type described above.

BRIEF DESCRIPTION OF THE DRAWINGS

The invention will be better understood, and further details, advantages and characteristics of the same will appear upon reading the following description made by way of non-limiting example and in reference to the appended drawings wherein:

FIG. 1 already described, is a longitudinal partial schematic cross-section half-view of a space launcher of a first known type;

FIG. 2, already described, is a longitudinal partial schematic cross-section half-view of a space launcher of a second known type;

FIG. 3 is a longitudinal schematic cross-section half-view of a space launcher according to a preferred embodiment of the invention;

FIG. 4 is a side partial schematic view of the space launcher of FIG. 3.

Throughout these figures, identical references can designate identical or analogous elements.

DETAILED DISCLOSURE OF A PREFERRED EMBODIMENT

FIGS. 3 and 4 generally illustrate a temporary structural connection between two consecutive stages of a space launcher.

More precisely, FIG. 3 represents a connection area between two respective structural walls 10, 12 of these two stages, these walls having generally a revolution symmetry about a longitudinal axis 30 of these stages and being made of a composite material.

Such a structural connection is mainly intended to the transmission, between the aforesaid stages, of tensile strains parallel to the longitudinal axis 30, but also to a lesser extent, of shear strains.

Each of the structural walls 10, 12 of these stages includes a respective end part 32, 34 the external surface of which is covered with a corresponding layer of adhesive 36, 38 which circumferentially extends about the axis 30 as an annular strip.

In the particular example described in FIG. 3, the adhesive is a rigid curable adhesive based on an epoxy resin, marketed by the Henkel Company under the trademark Hysol, having one of the commercial references EA9321, EA9394, EA9395 and EA9396.

Moreover, mineral microbeads are incorporated in this adhesive to homogenize the thickness of each layer of adhesive as well as to distribute the stresses within each layer of adhesive.

Besides, a connecting strap 40, also made of composite material, surrounds the end parts 32, 34 of the walls 10, 12 and adheres to these end parts 32, 34 through the corresponding layers of adhesive 36, 38.

The connecting strap 40 is circumferentially pre-stressed such that keeping it into its operating position contacting the walls 10 and 12 causes, within this strap, an internal deformation stress being essentially in the form of bending strains.

These strains are mainly resisted by release bolts 52' (FIG. 4) which connect two free ends 50' of the connecting strap 40 so as to ensure the locking of the position thereof in contact with the walls 10, 12. These bolts are not visible in FIG. 3 but are visible in the rest position of the strap in FIG. 4. The locking of the strap 40 is made under stress, which means it is carried out against the aforesaid internal bending strains.

Besides, the walls 10, 12 of the stages of the launcher each include, optionally, a circumferential stiffener 42, 44 attached to their internal surface facing the corresponding layer of adhesive 36, 38, in order to resist part of the aforesaid bending strains, in particular at an area of each wall 10, 12 which is diametrically opposite the connecting area of the free ends of the strap 40.

In the particular example described in FIG. 3, each wall 10, 12 made of a composite material includes a surface external ply 46, 48 formed by reinforced fibres, for example of carbon, which are embedded in a cured resin and which extend parallel to the axis 30 of the walls 10, 12. The layers of adhesive 36, 38 thus cover these external surface plies 46, 48.

In operation, strains, in particular longitudinal tensile strains, that is parallel to the axis 30, efficiently transmit between the structural walls 10, 12 of these stages of the launcher through the connecting strap 40 and the layers of adhesive 36, 38, this throughout the circumference of these walls 10, 12.

It is worth of note that the layers of adhesive transmit the tensile strain between the stages of the launcher all the better as the part of the bending strains of the strap 40 which is resisted by these layers of adhesive is small, and thus as the part of these bending strains resisted by the release bolts and the circumferential stiffeners 42 and 44 is great.

When the separation of the two stages of the launcher is desired, an adequate control is sent to the release bolts to trigger the explosive rupture thereof.

This rupture results in most of the bending strains of the connection strap 40 being no longer resisted and being exerted then on each layer of adhesive 36, 38, which causes a gradual peeling off of these layers of adhesive and/or of the external surface ply 46, 48 of the walls 10, 12 on which these layers of adhesive are applied.

This peeling off is propagated from the area of the walls 10, 12 which initially faces the free ends of the strap 40 up to the diametrically opposite area so as to enable the stages of the launcher to be finally separated.

This separation can then be reinforced by conventional separating means, such as springs or propellers, which equip the space launcher optionally within the scope of the present invention.

The temporarily connection described above can be advantageously made by a method according to the invention.

In a particular example of such a method, an annular strip shaped layer 36, 38 of rigid curable adhesive, based on an epoxy resin wherein mineral microbeads are incorporated, is first applied to respective end parts of the walls 10, 12 of two stages of a space launcher.

Then, a circumferentially pre-stressed connecting strap is deformed against its pre-stress to be positioned around both layers of adhesive 36, 38. This step is illustrated by FIG. 4 which shows the connecting strap at rest 40' (in dashed line), and the same strap in operating position 40 (in continuous line) which is thus subjected to an internal deformation stress.

In a following step, release bolts connecting the free ends 50' of the strap are tightened so as to stress the connecting strap 40 in its operating position contacting the respective layers of adhesive 36, 38 of the structural walls 10 and 12. These bolts, in their tightening position, are masked in FIG. 4, but they are visible in the rest position of the strap and designated by reference 52' in this figure.

Then, the adhesive is caused to be cured, for example by heating in the case where the adhesive is of the thermocurable type.

Since the strains induced by the internal deformation stress of the strap are resisted by the release bolts, the adhesive can be cured substantially without stress.

This method, described by way of non-limiting example, thus enables a temporary connection to be made by means of simple and light elements, while enabling connection strains to be efficiently transmitted between the launcher stages.

What is claimed is:

1. An assembly comprising two parts temporarily connected by a connecting element surrounding said assembly, wherein:
   said connecting element is subjected to an internal bending deformation stress,
   said assembly comprises stress-keeping means with controlled stress relief, which connect two opposite ends of said connecting element so as to counteract said internal bending deformation stress,
   said assembly comprises attaching means for attaching said connecting element to each of said parts,
   said attaching means comprise at least two layers of cured adhesive which respectively coat said parts and make a surface connection between each of the parts and said connecting element,
   said internal bending deformation stress is at a sufficient level to unsecure the connecting element from said parts by extending the connecting element to a rest position, when said stress-keeping means are controlled so as to release said ends of said connecting element,
   wherein said connecting element has a first, flat shape when not attached to said parts of said assembly and a second, ring shape when said stress-keeping means connects two opposite ends of said connecting element, and
   wherein bending said connecting element from said first, flat shape to said second, ring shape creates said internal bending deformation stress in said connecting element.

2. The assembly according to claim 1, wherein said stress-keeping means apply to said connecting element strains substantially orthogonal to a main direction of transmitting tensile strains between said parts.

3. The assembly according to claim 2, wherein each of said parts comprises a composite structure including a surface ply of reinforcing fibres which are embedded in a cured resin and which extend parallel to said main direction of transmitting tensile strains between said parts.

4. The assembly according to claim 1, wherein said connecting element comprises a strap, and each of said parts comprises a cylindrical wall surrounded by said strap.

5. The assembly according to claim 1, wherein the two parts are part of a space vehicle or of a missile or an airplane.

6. A space vehicle, such as a launcher, a satellite or a probe, missile or airplane, comprising at least one assembly according to claim 1.

7. A method for making a temporary connection between two parts of an assembly, the method including at least the steps of:
- applying two layers of a curable adhesive to each of said parts respectively; and then
- placing a connecting element into an operating position wherein said connecting element surrounds the assembly formed by said parts and is subjected to an internal bending deformation stress;
- locking the position of said connecting element by stress-keeping means with controlled stress relief, which connect two opposite ends of said connecting element; and then
- curing said adhesive such that said layers of adhesive form attaching means connecting said connecting element to each of said parts;
- wherein said connecting element has a first, flat shape when not attached to said parts of said assembly and a second, ring shape when said stress-keeping means connects two opposite ends of said connecting element, and
- wherein bending said connecting element from said first, flat shape to said second, ring shape creates said internal bending deformation stress in said connecting element at a sufficient level to unsecure the connecting element from said parts when said stress-keeping means release said ends from said connecting element.

8. The method according to claim 7, wherein said adhesive incorporates mineral microbeads forming spacers between each of said parts and said connecting element.

9. The method according to claim 7, wherein said stress-keeping means apply to said connecting element strains substantially orthogonal to a main direction of transmitting tensile strains between said parts.

10. The method according to claim 9, wherein each of said parts comprises a composite structure including a surface ply of reinforcing fibres embedded in a cured resin and extending parallel to said main direction of transmitting tensile strains between said parts.

11. The method according to any of claim 7, wherein said stress-keeping means are of the explosive rupture type.

12. The method according to claim 7, wherein said parts are two respective structural cylindrical walls of two stages of a space launcher, and said connecting element is a circumferentially pre-stressed strap which surrounds each of said walls when this strap is in its operating position.

* * * * *